United States Patent [19]

Oldenkamp

[11] 4,322,613
[45] Mar. 30, 1982

[54] METHOD FOR TAMPER-PROOFING MAGNETIC STRIPE CARD READER

[75] Inventor: Ralph J. Oldenkamp, Oakland, Calif.

[73] Assignee: Vendacopy, Inc., Foster City, Calif.

[21] Appl. No.: 138,389

[22] Filed: Apr. 8, 1980

[51] Int. Cl.³ .................. G06K 7/08; G06K 13/00; G11B 5/00; G06K 5/00
[52] U.S. Cl. ........................... 235/449; 235/437; 235/477; 360/1
[58] Field of Search ............... 194/4 F; 235/381, 380, 235/482, 449, 477, 480, 475; 340/149 A; 360/1, 2; 101/34

[56] References Cited
U.S. PATENT DOCUMENTS

| Re. 28,701 | 1/1976 | Edwards | 235/381 |
| 3,356,021 | 12/1967 | May | 360/1 |
| 3,976,857 | 8/1976 | Hogberg | 235/437 |
| 4,176,259 | 11/1979 | Lee | 235/466 |
| 4,237,375 | 12/1980 | Granholm | 235/437 |

Primary Examiner—Robert M. Kilgore
Attorney, Agent, or Firm—Townsend and Townsend

[57] ABSTRACT

A method for inhibiting tampering with data on a magnetic stripe card is disclosed. The data are erased if the card is prematurely withdrawn from the reader/writer. A write protect bit is set and recorded on the card if the power source is interrupted. Apparatus for activating the tamper-proofing techniques are disclosed.

4 Claims, 2 Drawing Figures

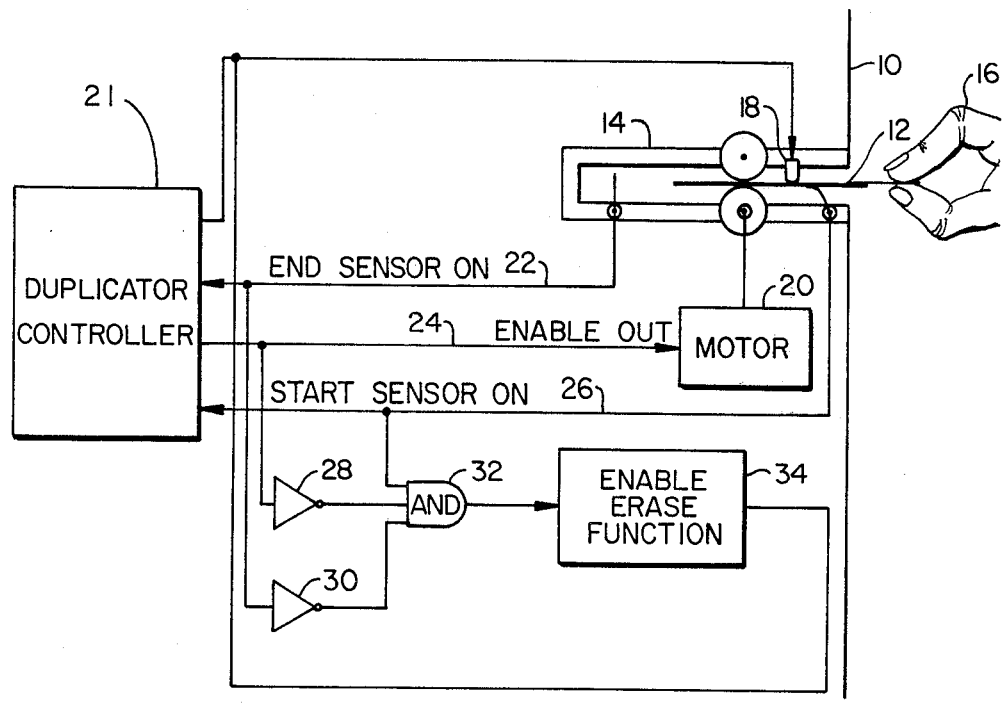
FIG._1.
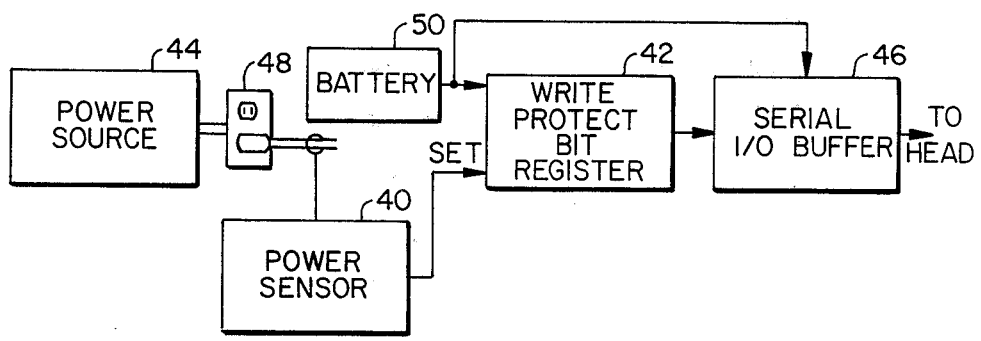
FIG._2.

METHOD FOR TAMPER-PROOFING MAGNETIC STRIPE CARD READER

BACKGROUND OF THE INVENTION

1. Field of the Invention

This invention relates to vending machine control systems using magnetically encoded readable/writeable cards as a medium of exchange. In particular, the invention relates to techniques and means for preventing the registration of false information on the magnetic cards and to prevent abuse of the information on the magnetic cards.

In the past, two particular problems have existed with respect to magnetic card accounting systems. First, card users have occasionally attempted to withdraw the magnetic card from the reader/writer before the registration of updated accounting information on the magnetic stripe of the card in order to be able to reuse the card. The structure of magnetic card reads is such that the updating information is intended to be recorded on the card as it is ejected from the reader/writer. In the past, it has therefore been possible to withdraw the card prior to updating by, for example, placing a piece of tape on the card and manually pulling the tape and card out of the reader/writer.

Second, vending machine power sources are subject to interruption, either accidentally or intentionally. Accidental power interruption may occur whenever there is a main power failure. Intentional interruption may be the attempt of someone to stop machine operation prior to the recording of updating information in order to prevent the card value from being updated. Means and techniques are needed to cope with these common problems to assure security and reliability of a vending machine accounting system.

2. Brief Description of the Prior Art

Heretofore, power source interruption has been guarded against by providing a battery backup to the memory elements of the control systems of a duplicator controller.

SUMMARY OF THE INVENTION

A method for inhibiting tampering with the data on a readable/writeable magnetic card in a vending machine system is provided whereby the unauthorized withdrawal of the card is sensed in a manner causing the erasure of the data on the magnetic stripe. Power interruption of the machine system is also sensed and a write protect bit is written onto the magnetic stripe upon ejection of the card from the reader/writer.

One of the objects of this invention is to foil a user who would defraud the system by withdrawing the magnetic card prematurely. Another object of the invention is to provide an indication that the data on the card may be in error due to accidental or intentional power failure of the machine system.

These and other objects and the advantages of the invention will be apparent upon reference to the following detailed description taken in conjunction with the accompanying drawings.

BRIEF DESCRIPTION OF THE DRAWINGS

FIG. 1 is a block diagram of a preferred embodiment of the invention for protecting against unauthorized withdrawal of magnetic stripe cards.

FIG. 2 is a block diagram of a preferred embodiment of the invention for protecting against errors caused by a power failure.

DESCRIPTION OF SPECIFIC EMBODIMENTS

Referring to FIG. 1 there is shown a portion of a vending machine control system 10 such as might be used as a vending machine latch. Vending machine latches which are coin-operated are relatively well-known. A machine system employing magnetic card actuation is U.S. Pat. No. 3,356,021 to G. H. May et al. The present invention may be used in connection with such a system or with a photocopy type duplicator controller. The invention is therefore explained with respect to a duplicator system.

The vending machine control system 10 includes a reader/writer 14 for a magnetic stripe card 12. The reader/writer 14 is equipped with a magnetic head 18 for reading and writing information on the magnetic stripe of the magnetic stripe card 12. The magnetic stripe card 12 is driven by a motor 20 under the control of a controller 21 of the vending machine control system 10 such as a photocopy type duplicator controller. The reader/writer 14 is equipped with two sensing switches, namely, a START sensor and an END sensor, whose states are indicated by control lines 26 and 22. The START sensor on control line 26 is active whenever the corresponding switch senses the presence of a magnetic stripe card 12 at the entrance slot of the reader/writer 14. The END sensor on line 22 is active whenever its corresponding switch indicates that the magnetic stripe card 12 is fully inserted into the reader/writer 14.

The motor 20 is driven by various state control lines, the only one of which relevant hereto is the ENABLE OUT control line 24. The ENABLE OUT control line 24 is active in response to a signal from the duplicator controller 21 to urge the motor 20 to eject the magnetic stripe card 12.

Whenever a potential user attempts to defraud the vending machine control system 10 by withdrawing the magnetic stripe card 12 by hand 16, for example, through the medium of a string, tape or foreign matter attached to the card, before the motor 20 is activated, the END sensor switch will be deactivated. Accordingly, the END sensor on line 22 is deactivated.

According to the invention, attempted unauthorized withdrawal of a magnetic stripe card 12 is sensed by the confluence of an inactive END sensor on line 22, and inactive ENABLE OUT line 24 and an active START sensor on line 26. The confluence of these lines at an AND gate 32 stimulates a machine response. The START sensor on line 26 is gated to the first input of the three input AND gate 32, the ENABLE OUT line 24 is gated through an inverter gate 28 to the second input of the three input AND gate 32 and the END sensor on line 22 is gated through an inverter gate 30 to the third input of the three input AND gate 32. The output of the AND gate 32 drives an ENABLE ERASE function 34. The ENABLE ERASE function 34 merely activates the erase head 18. Any unauthorized attempt to withdraw the magnetic stripe card 12, with the magnetic head 18 activated in its ERASE function causes the magnetic stripe to be erased. The attempted defrauder is accordingly foiled because his card is thereafter essentially valueless. If he should attempt to redeem his card, the key operator would be alerted by the condition of the card to the attempted abuse of the vending machine system 10.

Turning now to FIG. 2, there is shown a further specific embodiment of the invention. A power source 44 connected to a power outlet 48 provides the essential power to a vending machine control system (not shown). A power sensor 40 is operative to sense the presence or absence of a power connection. According to the invention, a write protect register 42 is coupled to receive a set signal from the power sensor 40 whenever power is interrupted. The write protect register 42 is coupled to a serial input/output (I/O) buffer 46 which in turn is coupled to the record head (not shown) of a reader/writer 14 (FIG. 1). A battery 50 provides backup power to the write protect register 42 and optionally to the serial I/O buffer 46 so that power interruption does not affect the ability of the system to record a write protect bit on the magnetic stripe card.

In summary, there is provided a method for inhibiting tampering with readable/writeable magnetic card 12 in a vending machine control system 10 which comprises sensing the entry of the card 12 at the beginning of a path of travel into the reader/writer 14, causing the reader/writer 14 to draw the card 12 along the path by the motor 20, signaling the presence of the card 12 at the end of the path by an END sensor on signal 22, activating the erase head 18 whenever the END sensor on signal 22 is absent and the motor 20 is off so that any unauthorized attempt to withdraw the card 12 causes the information on the magnetic stripe of the magnetic stripe card 12 to be erased.

Further according to the invention, the connection of the system to an input power source is sensed, and a write protect bit register 42 is set whenever the power is interrupted as sensed by a power sensor 14, a write protect bit is written onto the magnetic card upon ejection of the card 12 from the reader/writer 14.

The invention has now been described with reference to specific embodiments. Other embodiments will be apparent to those of ordinary skill upon reference to this description. It is accordingly not intended that this invention be limited except as indicated by the appended claims.

What is claimed is:

1. A method for inhibiting tampering with a readable/writeable magnetic stripe card in a vending machine control system comprising the steps of:
   sensing the entry of said card to a magnetic card reader/writer of said machine system;
   drawing said card into said reader/writer along a path of travel by a motor;
   signaling presence of said card at a preselected position along said path whereupon said motor is turned off and said card is stopped; thereafter
   activating an erase head of said reader/writer in the absence of said presence signaling and during periods when said motor is off; and
   erasing and not replacing magnetic information encoded on said card only in response to translation of said card along said path when said motor is off.

2. The method as claimed in claim 1 further including the step of setting a write protect bit in a write protect bit register of said vending machine control system whenever power input to said vending machine control system is interrupted; and writing said write protect bit on said card upon ejection of said card from said reader/writer.

3. The method as claimed in claim 1 wherein said activating step further requires the presence of said entry sensing.

4. A method for signaling the interruption of power in a vending machine control system employing readable/writeable magnetic cards comprising the steps of:
   monitoring the state of power to said vending machine control system;
   setting a write protect bit in a write protect register of said vending machine control system if power is interrupted while a readable/writeable magnetic card is present in said reader/writer;
   storing said write protect bit until power is restored; and thereafter
   writing said write protect bit on said card upon ejection of said card.

* * * * *